US012591697B2

(12) United States Patent
Manurangsi et al.

(10) Patent No.: US 12,591,697 B2
(45) Date of Patent: Mar. 31, 2026

(54) PRIVACY SENSITIVE ESTIMATION OF DIGITAL RESOURCE ACCESS FREQUENCY

(71) Applicant: Google LLC, Mountain View, CA (US)

(72) Inventors: Pasin Manurangsi, Bangkok (TH);
Badih Ghazi, Cupertino, CA (US);
Shanmugasundaram Ravikumar,
Piedmont, CA (US); Jelani Osei Nelson, Berkeley, CA (US)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 18/684,996

(22) PCT Filed: Jul. 14, 2023

(86) PCT No.: PCT/US2023/027731
§ 371 (c)(1),
(2) Date: Feb. 20, 2024

(87) PCT Pub. No.: WO2024/039474
PCT Pub. Date: Feb. 22, 2024

(65) Prior Publication Data
US 2025/0131112 A1      Apr. 24, 2025

Related U.S. Application Data

(60) Provisional application No. 63/398,785, filed on Aug. 17, 2022.

(51) Int. Cl.
*H04L 29/06*        (2006.01)
*G06F 21/62*        (2013.01)
(52) U.S. Cl.
CPC ...... *G06F 21/62* (2013.01); *G06F 2221/2101* (2013.01)

(58) Field of Classification Search
CPC ....................................................... G06F 21/62
See application file for complete search history.

(56) References Cited

U.S. PATENT DOCUMENTS

2014/0281260 A1      9/2014   Peterson et al.
2019/0394219 A1*    12/2019   Huang ................ H04L 63/1425

FOREIGN PATENT DOCUMENTS

CN              108153870          6/2018
CN              108153870 A    *   6/2018   ......... G06F 16/2465

OTHER PUBLICATIONS

Yufei, Tao. MV3R-Tree: a Spatio-Temporal Access Method for Timestampa nd Interval Queries. Technical Report HKUST-CS00-06. Dec. 2000. 24 Pages.*

(Continued)

*Primary Examiner* — Jason K Gee
(74) *Attorney, Agent, or Firm* — Fish & Richardson P.C.

(57)          ABSTRACT

In one aspect, there is provided a method performed by one or more computers that includes: obtaining access data for a digital resource, access data including data identifying a set of users that accessed the digital resource at a time point, processing the access data to generate data defining a tree model, where each node in the tree model is associated with: (i) a key that specifies time intervals in the time span, and (ii) a value that is based on a respective number of users that satisfy a node-specific selection, receiving a request to determine a number of users that accessed the digital resource at least a predefined number of times within a time window, and in processing the tree model to generate an estimate for the number of users that accessed the digital resource at least the predefined number of times within the time window.

20 Claims, 6 Drawing Sheets

ACCESS FREQUENCY ESTIMATION SYSTEM 100

(56)                 References Cited

OTHER PUBLICATIONS

Acharya et al., "The aqua approximate query answering system" Proceedings of the 1999 ACM SIGMOD international conference on Management of data, Jun. 1999, 574-576.

Agarwal et al., "The price of differential privacy for online learning" In ICML, Jul. 2017, 9 pages.

Akella et al., "Detecting DDOS attacks on ISP networks" Proceedings of the Workshop on Management and Processing of Data Streams, Jun. 2003, 3 pages.

Baker et al., "Dashing: fast and accurate genomic distances with HyperLogLog" Genome Biology, 20(1), Dec. 2019, 12 pages.

Balcer et al., "Connecting robust shuffle privacy and pan-privacy" CoRR, Submitted on Aug. 2020, arXiv:2004.009481v4, 30 pages.

Bolot et al., "Private decayed predicate sums on streams" In ICDT, Mar. 2013, 284-295.

Breitwieser et al., "Krakenuniq: confident and fast metagenomics classification using unique k-mer counts" Genome Biology, 19(1), Dec. 2018, 10 pages.

Bun et al., "Differentially private release and learning of threshold functions" CoRR, Submitted on Apr. 2015, arXiv:1504.07553v1, 43 pages.

Bun et al., "Fingerprinting codes and the price of approximate differential privacy" CoRR, Submitted on Oct. 2018, arXiv:1311. 3158v3, 56 pages.

Cardoso et al., "Differentially private histograms under continual observation: Streaming selection into the unknown" International Conference on Artificial Intelligence and Statistics. PMLR, May 2022, 23 pages.

Chan et al., "Private and continual release of statistics" ACM Transactions on Information and System Security (TISSEC) 14.3, Nov. 2011, 23 pages.

Chen [online], "Ara, tell me what my campaign forecast looks like for today" available on or before Jul. 2, 2021, via internet archive: Wayback Machine URL <https://web.archive.org/web/20210716160405/https://www.quantcast.com/blog/ara-tell-me-what-my-campaign-forecast-looks-like-for-today/>, retrieved on Jul. 29, 2024, URL <https://www.quantcast.com/blog/ara-tell-me-what-my-campaign-forecast-looks-like-for-today/>, 3 pages.

Chen et al., "On distributed differential privacy and counting distinct elements" CoRR, Submitted on Sep. 2020, arXiv:2009. 09604v1, 68 pages.

Cheong et al., "The power of reach and frequency in the age of digital advertising: Offline and online media demand different metrics" J. Advertising Res., 50, Dec. 2010, 403-415.

Denisov et al., "Improved Differential Privacy for SGD via Optimal Private Linear Operators on Adaptive Streams" CoRR, Submitted on Jan. 2023, arXiv:2202.08312v3, 33 pages.

Dinur et al., "Revealing information while preserving privacy" Proceedings of the twenty-second ACM SIGMOD-SIGACT-SIGART symposium on Principles of database systems, Jun. 2003, 202-210.

Dwork et al., "Boosting and differential privacy." 2010 IEEE 51st annual symposium on foundations of computer science. IEEE, Oct. 2010, 32 pages.

Dwork et al., "Calibrating noise to sensitivity in private data analysis" Theory of Cryptography: Third Theory of Cryptography Conference, TCC 2006, New York, NY, USA, Mar. 4-7, 2006, 20 pages.

Dwork et al., "Differential privacy under continual observation" Proceedings of the forty-second ACM symposium on Theory of computing, Jun. 2010, 10 pages.

Dwork et al., "Our data, ourselves: Privacy via distributed noise generation" Advances in Cryptology-EUROCRYPT 2006: 24th Annual International Conference on the Theory and Applications of Cryptographic Techniques, St. Petersburg, Russia, May 28-Jun. 1, 2006, 18 pages.

Dwork et al., "Pan-private streaming algorithms" In ICS, Jan. 2010, 32 pages.

Dwork et al., "Pure differential privacy for rectangle queries via private partitions." International Conference on the Theory and Application of Cryptology and Information Security. Berlin, Heidelberg: Springer Berlin Heidelberg, Nov. 2015, 17 pages.

Dwork et al., "The price of privacy and the limits of LP decoding" Proceedings of the thirty-ninth annual ACM symposium on Theory of computing, Jun. 2007, 10 pages.

Estan et al., "Bitmap algorithms for counting active flows on high speed links." Proceedings of the 3rd ACM SIGCOMM conference on Internet measurement, Oct. 2003, 22 pages.

Fichtenberger et al., "Constant matters: Fine-grained Error Bound on Differentially Private Continual Observation Using Completely Bounded" CoRR, Submitted on Feb. 2024, arXiv:2202.11205v6, 27 pages.

Fichtenberger et al., "Differentially private algorithms for graphs under continual observation" CoRR, Submitted on Nov. 2023, arXiv:2106.14756v2, 37 pages.

Gao et al., "An efficient ring-based metadata management policy for large-scale distributed file systems" IEEE Transactions on Parallel and Distributed Systems 30.9, Sep. 2019, 1962-1974.

Ghazi et al., "Multiparty reach and frequency histogram: Private, secure, and practical" Proceedings on Privacy Enhancing Technologies, 2022, 373-395.

Github.com [online], "WFA Measurement System" Mar. 2021, retrieved on Jul. 29, 2024, retrieved from URL <https://github.com/world-federation-of-advertisers/cross-media-measurement>, 6 pages.

Hardt et al., "On the geometry of differential privacy" CoRR, Submitted on Nov. 2009, arXiv:0907.3754v3, 27 pages.

Henzinger et al., "Constant matters: Fine-grained complexity of differentially private continual observation using completely bounded norms." Cryptology ePrint Archive, 2022, 14 pages.

Heule et al., "Hyperloglog in practice: Algorithmic engineering of a state of the art cardinality estimation algorithm" In EDBT, Mar. 2013, 10 pages.

Honaker, "Efficient use of differentially private binary trees." Theory and Practice of Differential Privacy (TPDP 2015), London, UK 2, Jan. 2015, 6 pages.

International Search Report and Written Opinion in International Appln. No. PCT/US2023/027731, mailed on Nov. 7, 2023, 15 pages.

Jain et al., "Differentially private online learning" Conference on Learning Theory. JMLR Workshop and Conference Proceedings, Jun. 2012, 24:1-34.

Jain et al., "The price of differential privacy under continual observation." International Conference on Machine Learning. PMLR, Jul. 2023, 25 pages.

Kane et al., "An optimal algorithm for the distinct elements problem." Proceedings of the twenty-ninth ACM SIGMOD-SIGACT-SIGART symposium on Principles of database systems, Jun. 2010, 12 pages.

Leckenby et al., "Using reach/frequency for web media planning." Journal of Advertising Research 38.1, Jan.-Feb. 1998, 7-20.

McMahan et al., "Private online prefix sums via optimal matrix factorizations" Submitted on Feb. 2022, arXiv:2202.08312v1, 23 pages.

McSherry et al., "Privacy integrated queries: an extensible platform for privacy-preserving data analysis" Commun. ACM, 2010, 53(9):89-97.

Muthukrishnan et al., "Optimal private halfspace counting via discrepancy" CoRR, Submitted on Mar. 2012, arXiv:1203.5453v1, 13 pages.

Padmanabhan et al., "Multi dimensional clustering: a new data layout scheme in DB2" In SIGMOD, Jun. 2003, 634-638.

Palmer et al., "Anf: a fast and scalable tool for data mining in massive graphs" In KDD, 2002, 10 pages.

Perrier et al., "Private continual release of real-valued data streams" CoRR, Submitted on Nov. 2018, arXiv:1811.03197v1, 13 pages.

Poosala et al., "Improved histograms for selectivity estimation of range predicates" Sigmod Record, 1996, 25(2):294-305.

Selinger et al., "Access path selection in a relational database management system" In Readings in Artificial Intelligence and Databases, 1979, 23-34.

Shukla et al., "Storage estimation for multidimensional aggregates in the presence of hierarchies" In VLDB, pp. 1996, 10 pages.

(56) References Cited

OTHER PUBLICATIONS

Smith et al., "The flajolet-martin sketch itself preserves differential privacy: Private counting with minimal space" In NeurIPS, 2020, 12 pages.

Song et al., "Differentially private continual release of graph statistics" CoRR, Submitted on Sep. 2018, arXiv:1809.02575v2, 21 pages.

Steinke et al., "Between pure and approximate differential privacy" CoRR, Submitted on Jan. 2015, arXiv:1501.06095v1, 15 pages.

Thakurta et al., "(Nearly) optimal algorithms for private online learning in full-information and bandit settings." Advances in Neural Information Processing Systems 26, 2013, 9 pages.

Vadhan, "The Complexity of Differential Privacy" Tutorials on the Foundations of Cryptography: Dedicated to Oded Goldreich, Mar. 14, 2017, 96 pages.

Wikipedia.org [online], "Effective frequency" created on Oct. 2007, retrieved on Aug. 21, 2024, retrieved from URL <https://en.wikipedia.org/w/index.php?title=Effective_frequency&oldid=1021978492>, 5 pages.

International Preliminary Report on Patentability in International Appln. No. PCT/US2023/027731, mailed on Feb. 27, 2025, 8 pages.

\* cited by examiner

ACCESS FREQUENCY ESTIMATION SYSTEM 100

EXAMPLE TWO-DIMENSIONAL TREE MODEL 300

DIGITAL RESOURCE ACCESS FREQUENCY ESTIMATION

400

OBTAIN ACCESS DATA FOR A DIGITAL RESOURCE — 402

PROCESS ACCESS DATA TO GENERATE DATA DEFINING A TREE MODEL — 404

RECEIVE A REQUEST TO DETERMINE A NUMBER OF USERS THAT ACCESSED THE DIGITAL RESOURCE — 406

PROCESS THE TREE MODEL TO GENERATE AN ESTIMATE FOR THE NUMBER OF USERS THAT ACCESSED THE DIGITAL RESOURCE — 408

PRIVACY SENSITIVE ESTIMATION OF DIGITAL RESOURCE ACCESS FREQUENCY

CROSS-REFERENCE TO RELATED APPLICATIONS

This application is a National Stage Application under 35 U.S.C. § 371 and claims the benefit of International Application No. PCT/US2023/027731, filed Jul. 14, 2023, which claims priority to U.S. Application No. 63/398,785, filed Aug. 17, 2022. The disclosures of the prior applications are considered part of and are incorporated herein by reference.

BACKGROUND

This specification relates to privacy sensitive estimation of digital resource access frequency.

Digital resources can be accessed by large numbers of remotely located users. Determining the number of users that access digital resources can be used, e.g., to manage distribution and storage of digital resources.

The extent to which a process is privacy preserving can be measured in various ways. For example, differential privacy techniques can be used to quantify the extent to which processes are privacy preserving. A computational process operating on a dataset can be referred to as being privacy sensitive (or privacy preserving), e.g., if the process is adapted to prevent leakage of information from the dataset.

SUMMARY

This specification describes a system implemented as computer programs on one or more computers in one or more locations that can perform efficient and privacy sensitive estimation of digital resource access frequency.

According to a first aspect there is provided a method performed by one or more computers, the method including: obtaining access data for a digital resource, where the access data comprises, for each time point in a sequence of time points, data identifying a set of users that accessed the digital resource at the time point, processing the access data to generate data defining a tree model, where the tree model includes a set of nodes, and each node in the set of nodes is associated with: (i) a key that specifies a plurality of time intervals in the time span, and (ii) a value that is based on a respective number of users that satisfy a node-specific selection criterion based on the plurality of time intervals specified by the key for the node, receiving a request to determine a number of users that accessed the digital resource at least a predefined number of times within a time window, and in response to the request: processing the tree model to generate an estimate for the number of users that accessed the digital resource at least the predefined number of times within the time window.

In some implementations, for one or more nodes in tree model, the key for the node specifies at least a first time interval, a second time interval, and a third time interval, where the first time interval, the second time interval, and the third time interval are each different.

In some implementations, for one or more nodes in the tree model, a user satisfies the node-specific selection criterion for the node only if: (i) the user accesses the digital resource at least once in the first time interval and at least once in the second time interval, and (ii) the user accesses the digital resource a target number of times in the third time interval.

In some implementations, for one or more nodes in the tree model, the target number of times is zero.

In some implementations, (i) the tree model is a two-dimensional tree model, (ii) for each node in the tree model, the key for the node is parameterized by a set of parameters that define a region of two-dimensional space, and (iii) for each parent node in the tree model, the region of the two-dimensional space defined by the key of the parent node is partitioned by regions of the two-dimensional space defined by keys of child nodes of the parent node.

In some implementations, for each node in the tree model: the key for the node is parameterized by respective parameters a, b, c, d, the parameters define the region of two-dimensional space given by: [a, b]×[c, d], the first time interval includes [a−1, b−1], the second time interval includes [T+2−d,T+2−c], where T is a last time point in the sequence of time points, and the third time interval includes [b,T+1−d].

In some implementations, for each node in the tree model, the value associated with the node is based on a difference between: (i) a number of users that satisfy a first node-specific selection criterion based on the plurality of time intervals specified by the key for the node, and (ii) a number of users that satisfy a second node-specific selection criterion based on the plurality of time intervals specified by the key for the node.

In some implementations, for one or more nodes in the tree model, the key for the node specifies at least a first time interval, a second time interval, a third time interval, and a fourth time interval, where the first time interval, the second time interval, the third time interval, and the fourth time interval are each different.

In some implementations, for one or more leaf nodes in the tree model: a user satisfies the first node-specific selection criterion for the node only if the user: (i) accesses the digital resource in the first time interval, and (ii) accesses the digital resource a target number of times in the second time interval, and a user satisfies the second node-specific selection criterion for the node only if: (i) the user accesses the digital resource in the third time interval, and (ii) accesses the digital resource the target number of times in the fourth time interval.

In some implementations, the target number of times is zero.

In some implementations, (i) the tree model is a one-dimensional tree model, (ii) for each node in the tree model, the key for the node is parametrized by a set of parameters that define a region of a one-dimensional space, and (iii) for each parent node in the tree model, the region of the one-dimensional space defined by the key of the parent node is partitioned by regions of the one-dimensional space defined by keys of child nodes of the parent node.

In some implementations, for one or more leaf nodes of the tree model: the key for the node is parameterized by parameter t, the parameters define the region of one-dimensional space given by t, the first time interval includes t−1, the second time interval includes [t,t+W−1], where W is a predefined hyper-parameter, the third time interval includes t+W−1, and the fourth time interval includes [t−1, t+W−2].

In some implementations, generating the tree model includes: adding respective noise to the value associated with each node in the tree model.

In some implementations, processing the tree model to generate the estimate for the number of users that accessed the digital resource at least the predefined number of times within the time window includes: identifying a plurality of nodes in the tree model that each have a respective key which satisfies an identification criterion based on the time window, determining a combination of the values associated with the identified nodes, and generating the estimate for the number of users based at least in part on the combination of the values associated with the identified nodes.

In some implementations, identifying the plurality of nodes in the tree model includes: identifying that one or more leaf nodes of the tree model and one or more internal nodes of the tree model each have a respective key which satisfies the identification criterion based on the time window; and where determining the combination of the values associated with the identified nodes includes: determining a sum of the values associated with the identified nodes.

In some implementations, a user accesses the digital resource by receiving a transmission of a digital component.

In some implementations, the tree model includes a set of edges, where each edge connects a respective pair of nodes in the tree model, and where the tree model is a binary tree model.

In some implementations, the method further includes: outputting the estimate for the number of users that accessed the digital resource at least the predefined number of times within the time window.

According to a second aspect, there is provided a system including: one or more computers, and one or more storage devices communicatively coupled to the one or more computers, where the one or more storage devices store instructions that, when executed by the one or more computers, cause the one or more computers to perform the operations of the method of any preceding aspect.

According to a third aspect, there are provided one or more non-transitory computer storage media storing instructions that when executed by one or more computers cause the one or more computers to perform the operations of the method of any preceding aspect.

Particular embodiments of the subject matter described in this specification can be implemented so as to realize one or more of the following advantages.

The system described in this specification can generate accurate and privacy preserving access frequency estimates. An access frequency estimate can refer to an estimate for a number of users that accessed a digital resource at least a threshold number of times during a time window. Access frequency estimates generated by the system can be referred to as being privacy preserving (or privacy sensitive), e.g., because they are adapted to prevent leakage of information about users. For instance, access frequency estimates generated by the system can satisfy criteria for being differentially private, e.g., such that the access frequency estimates cannot be leveraged to determine when and if individual users have accessed the digital resource.

To enable generation of privacy preserving access frequency estimates, the system can process access data for a digital resource (e.g., that identifies a respective set of users that accessed the digital resource at each of multiple time points) to generate a tree model (data structure). A tree model can refer to a hierarchical structure that includes a set of nodes and a set of edges, where each edge connects a respective "parent" node to a respective "child" node, and where each node (except for a root node) has one parent node.

The system can construct the tree model to encode the access data in a manner that enables an access frequency estimate to be generated for any time window by combining values associated with nodes in the tree model. To preserve privacy, the system can combine respective noise with the value associated with each node in the tree model, which has the effect of noising access frequency estimates generated using the tree model and thus preserving privacy. In particular, noising the access frequency estimates can preserve privacy by obfuscating information regarding individual users that might otherwise be leaked from the access frequency estimates.

The tree model can encode the access data in a manner that is tailored toward enabling the system to generate an access frequency estimate by combining the values associated with a limited number of nodes in the tree model, e.g., at most $\log(T)$ or $\log^2(T)$ nodes, where T is the number of time points covered by the access data. Generating an access frequency estimate using a limited number of nodes from the tree model has the effect of limiting the amount of noise injected into the access frequency estimate, and thus increasing the accuracy of the access frequency estimate while preserving privacy. In contrast, some conventional approaches to preserving privacy, e.g., that operate without the benefit of the tree model described in this specification, can only preserve privacy at the cost of injecting significantly more noise into access frequency estimates, thus resulting in significantly lower accuracy.

The system described in this specification enables reduced consumption of computational resources, e.g., memory and computing power, by enabling access frequency estimates to be generated for any time interval by combining values associated with a limited number of nodes in a tree model. In contrast, some conventional approaches for generating access frequency estimates require storing an entire set of access data (which requires more memory than storing the tree model) and processing the entire set of access data each time an access frequency estimate is generated (which consumes significantly more computing power than generating access frequency estimates by leveraging the tree model).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
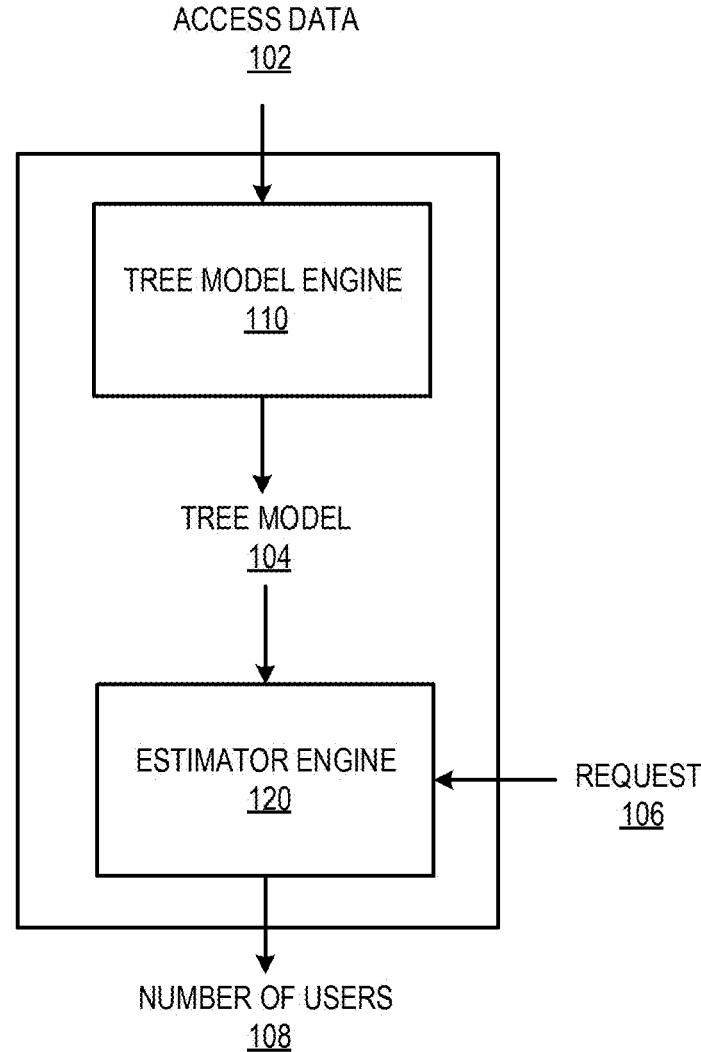
FIG. 1 is a block diagram of an example access frequency estimation system.

This specification describes an access frequency estimation system that can generate an accurate and privacy preserving access frequency estimate, e.g., an estimate for a number of users that accessed a digital resource at least a threshold number of times (e.g., at least once) during a time window.

A digital resource can refer to any appropriate digital data that is accessible to a set of users, e.g., by way of a computer. A user can access a digital resource in any of a variety of possible ways. A few examples of digital resources and of possible ways that users can access digital resources are described next.

In some implementations, a digital resource can be a data storage location, e.g., a database. A user can access a database, e.g., through an application programming interface (API) made available by the database, e.g., to query information from the database, or to store information in the database, or both.

In some implementations, a digital resource can be an application or a webpage, e.g., which a user can access by way of a user interface made available on a user device. Accessing an application or a webpage can refer to interacting with the application or webpage.

In some implementations, a digital resource can be a computational resource, e.g., one or more processors (e.g., central processing units (CPUs) or graphics processing units (GPUs)) made available to users in a cloud computing environment. A user can access a computational resource, e.g., by providing data defining one or more computational tasks to be performed using the computational resource.

In some implementations, a digital resource can be a digital component, and a user can access a digital resource by receiving a transmission of the digital resource at a user device, e.g., from a digital component transmission system. An example of a digital component transmission system is described with reference to FIG. 5.

As used throughout this document, the phrase "digital components" refers to discrete units of digital content or digital information that can include one or more of, e.g., video clips, audio clips, multimedia clips, images, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. Generally, a digital component is defined by (or provided by) a single source (e.g., a digital component provider), but a digital component provided from one source could be enhanced with data from another source (e.g., weather information, real time event information, or other information obtained from another source).

The access frequency estimation system can generate a privacy-preserving access frequency estimate. Throughout this specification, an "access frequency estimate" refers to an estimate for a number of users that accessed a digital resource at least a threshold number of times (e.g., at least once) during a time window. A "privacy-preserving" access frequency estimate refers to an access frequency estimate that is adapted to prevent leakage of information about users.

Figure 2:
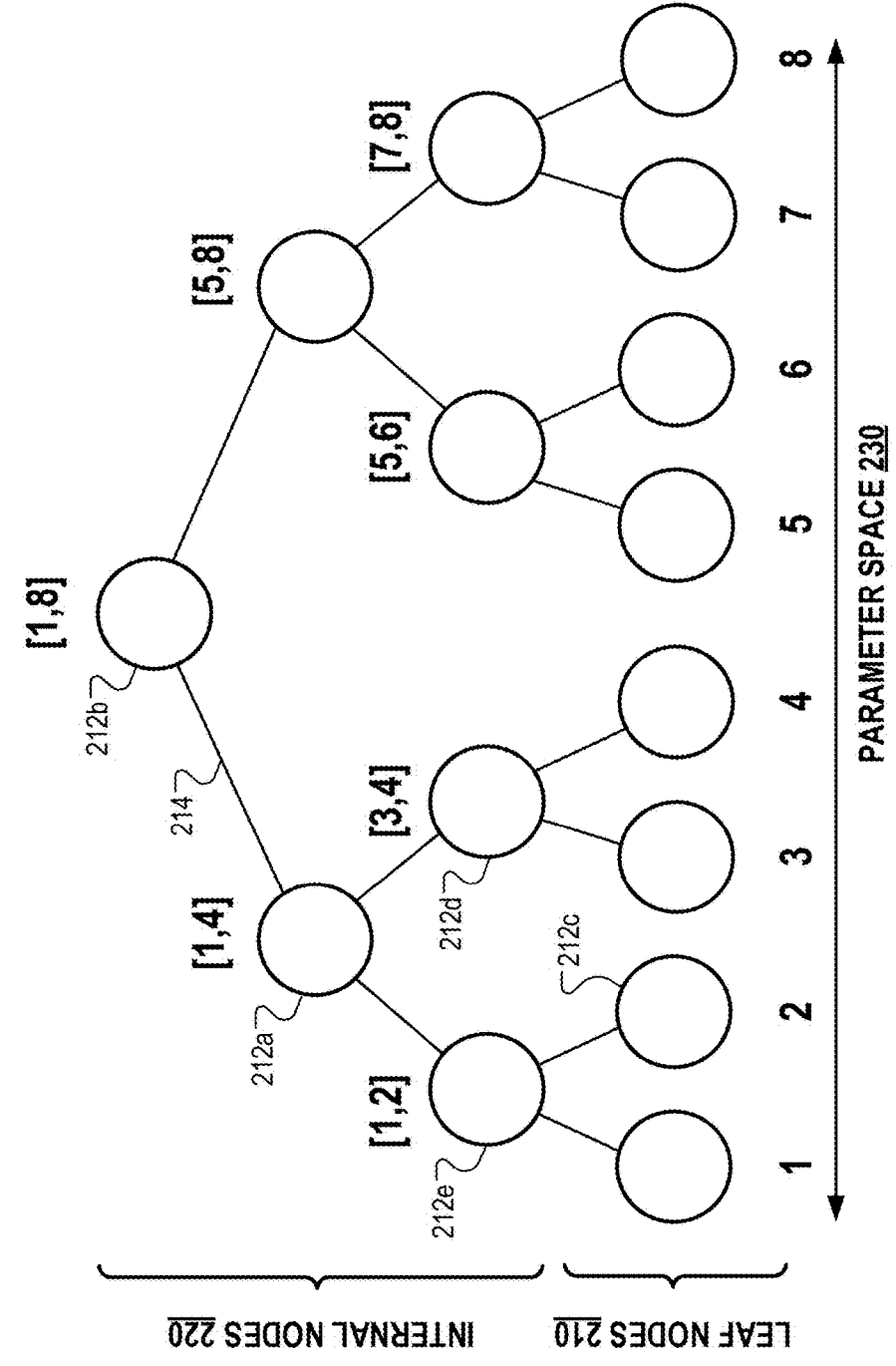
FIG. 2 illustrates an example one-dimensional (1D) tree model that can be used for representing digital resource access data.
Figure 3:
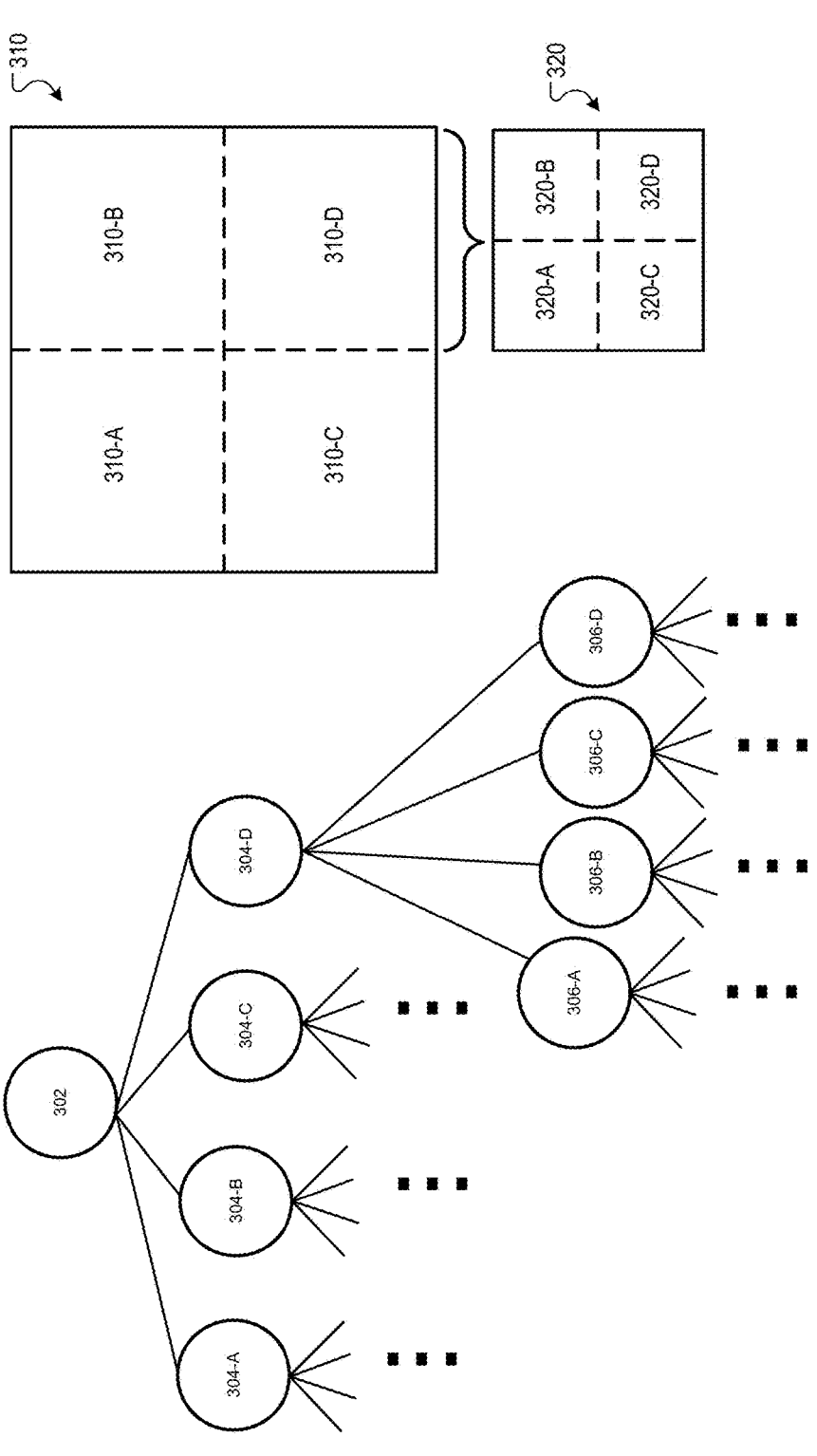
FIG. 3 illustrates another example of a two-dimensional (2D) tree model that can be used for representing digital resource access data.

To enable generation of privacy preserving access frequency estimates, the access frequency system can process access data for a digital resource (e.g., that identifies a respective set of users that accessed the digital resource at each of multiple time points) to generate a tree model, e.g., a 1D or 2D tree model. Throughout this specification, a "tree model" refers to a hierarchical data structure that includes a set of nodes and a set of edges, where each edge connects a respective "parent" node to a respective "child" node, and where each node (except for a root node) has one parent node. A "one-dimensional," or "1D," tree model refers to a tree model where each node of the tree model is parametrized by a set of parameters that define a region of a one-dimensional space. An example 1D tree model is illustrated in FIG. 2. A "two-dimensional," or "2D," tree model refers to a tree model where each node of the tree model is parametrized by a set of parameters that define a region of a two-dimensional space. An example 2D tree model is illustrated in FIG. 3.

The access frequency estimation system can process the 1D tree model to generate a fixed-window access frequency estimate. In the fixed-window implementation of the access frequency estimation system, a user of the system can be restricted to querying access frequency estimates for time intervals of a fixed length, e.g., including a fixed number of time points. The access frequency estimation system can process the 2D tree model to generate a time-window access frequency estimate. In the time-window implementation of the access frequency estimation system, a user of the system can query access frequency estimates for time intervals of any appropriate length, e.g., a first interval having two time points, and a second interval having five time points.

To preserve privacy, the access frequency estimation system can combine respective noise with the value associated with each node in the tree model (e.g., 1D or 2D tree model), which has the effect of noising access frequency estimates generated using the tree model and thus preserving privacy. The access frequency estimation system can process the tree model to generate an estimate for the number of users that accessed the digital resource at least the predefined number of times within the time window in a privacy-sensitive manner. These and other features are described in more detail below.

FIG. 1 is a block diagram of an example access frequency estimation system 100. The access frequency estimation system 100 is an example of a system implemented as computer programs on one or more computers in one or more locations in which the systems, components, and techniques described below are implemented.

The system 100 is configured to obtain access data 102 for a digital resource and process the access data 102 to generate an estimate for a number of users 108 that accessed the digital resource at least a threshold number of times during a time window. The access data 102 for a digital resource can specify a respective set of users that accessed the digital resource at each time point in a sequence of time points. (Each user can be associated, e.g., with a unique alphanumeric identifier). For each time point in the sequence of time points, the access data 102 can include data that identifies a set of users that accessed the digital resource at the time point. The access data 102 can include any appropriate number of time points, e.g., 1000 time points, 10,000 time points, 100,000 time points, or any other appropriate number of time points. The set of users that accessed the digital resource at a time point can include any appropriate number of users, e.g., 1000 users, 10,000 users, 100,000 users, or any other appropriate number of users. The system 100 can obtain the access data 102 in any appropriate manner. For example, the system 100 can receive the access data 102, e.g., through an API made available by the system 100.

As described above, the access frequency estimation system 100 can process the access data 102 to generate the estimate for the number of users 108 that accessed the digital resource at least the threshold number of times during the time window. The access frequency estimation system 100 can generate the estimate of the number of users 108 using: (i) a tree model engine 110, and (ii) an estimator engine 120, each of which is described in more detail next.

The tree model engine 110 can be configured to process the access data 102 to generate data defining a tree model 104. As described above, the tree model 104 can be a hierarchical data structure that includes a set of nodes and a set of edges, where each edge connects a respective pair of nodes in the tree model. Each edge can connect a "parent" node to a respective "child" node in the tree model, and each node (except for a root node) in the tree model can have one parent node. The set of nodes of the tree model can further include a set of leaf nodes, e.g., nodes that are each connected by an edge to a parent node, but not connected to any child nodes. In some cases, the tree model can be a binary tree model, e.g., a tree model where each non-leaf node is connected by edges to two child nodes. In some cases, the tree model can be a quadtree model, e.g., a tree model where each non-leaf node is connected by edges to four child nodes. In some cases, the tree model 104 can be a 1D tree model or a 2D tree model. The access frequency estimation system 100 can process the 1D tree model to generate a fixed-window access frequency estimate. The access frequency estimation system 100 can process the 2D tree model to generate a time-window access frequency estimate. Example tree models are described in more detail below with reference to FIG. 2 and FIG. 3.

As a particular example, referring to FIG. 2, the tree model 200 can be a 1D tree model that includes, e.g., a pair of nodes 212a, 212b that are connected by an edge 214, where the node 212b is a parent node, and the node 212a is a child node of the parent node 212b. The parent node 212b is also a root node, e.g., a node that is connected by edges to one or more child nodes, but not connected to any parent node. The set of nodes in the tree model 200 can further include a set of leaf nodes 210, e.g., nodes that are each connected by an edge to a parent node, but not connected to any child nodes. The other nodes in the tree model 200 that are not included in the set of leaf nodes 210 can be referred to as internal nodes 220 in the tree model 200. As a particular example, if the access data includes a sequence of time points that includes, e.g., eight time points, the tree model engine can generate the tree model 200 illustrated in FIG. 2 that includes eight leaf nodes 210, one for each time point included in the access data.

Turning back to FIG. 1, each node in the tree model 104 is associated with a "key" that specifies multiple time intervals in a time span. Generally, the key can specify any appropriate number of time intervals, e.g., three time intervals or four time intervals. Each node in the tree model 104 can be associated with a "value" that is based on a respective number of users that satisfy a node-specific selection criterion based on the time intervals specified by the key for the node. Generally, the node-specific selection criterion can be any appropriate criterion. In some cases, the node-specific selection criterion can characterize, e.g., a number of times that a user accesses the digital resource in each of the time intervals specified by the key. Examples of node-specific selection criteria are described in more detail below.

In some cases, as part of generating the tree model 104, the tree model engine 110 can add respective noise to the value associated with each node in the tree model 104. For example, the tree model engine 110 can sample a noise value from a probability distribution and add (or otherwise combine) the noise value to the value associated with a node in the tree model 104. The distribution can be, e.g., a Gaussian distribution, a Laplace distribution, or any other appropriate distribution. In some cases, the tree model engine 110 can sample a new (e.g., different) noise value for each of the nodes included in the tree model 104. Example tree models are described in more detail below with reference to FIG. 2 and FIG. 3.

As described above, the tree model engine 110 is configured to receive the access data 102 and process the access data 102 to generate the tree model 104. The access frequency estimation system 100 can receive a request 106 to estimate the number of users 108 that accessed the digital resource at least a predefined number of times within a time window, e.g., at least 1 time, 5 times, or any other appropriate number of times. The system 100 can receive the request 106 in any appropriate manner. For example, the system 100 can receive the request 106 from a user of the system 100, e.g., through an API made available by the system 100.

In response to the request, the system 100 can use the estimator engine 120 to process the tree model 104 to generate the estimate for the number of users 108 that accessed the digital resource at least the predefined number of times within the time window. For example, the estimator 120 can process the tree model 104 to identify multiple nodes in the tree model 104 (e.g., including one or more leaf nodes and/or one or more internal nodes) that each have a respective key which satisfies an identification criterion based on the time window. The identification criterion can be any appropriate identification criterion. In some cases, the estimator 120 can identify that one or more leaf nodes and one or more internal nodes in the tree model 104 each have a respective key that satisfies the identification criterion based on the time window. For example, with reference to FIG. 2, the estimator can identify that the leaf node 212c and the internal node 212d each have a respective key that satisfies the identification criterion based on the time window.

Turning back to FIG. 1, the estimator 120 can determine a combination of the values associated with the identified nodes, e.g., as a sum of the values associated with the identified nodes, or in any other appropriate manner. Then, the estimator 120 can generate the estimate for the number of users 108 based at least in part on the combination of the values associated with the identified nodes. In some cases, the access frequency estimation system 100 can output the estimate for the number of users 108 that accessed the digital resource at least the predefined number of times within the time window, e.g., to a user of the system 100 through the API made available by the system 100.

In this manner, the access frequency estimation system 100 can generate the estimate for the number of users 108 (e.g., the access frequency estimate) by combining the values associated with a limited number of nodes in the tree model 104, e.g., at most log (T) or $\log^2(T)$ nodes, where T is the number of time points included in the access data 102. Generating the access frequency estimate 108 using a limited number of nodes from the tree model 104 has the effect of limiting the amount of noise injected into the access frequency estimate 108, and thus increasing the accuracy of the access frequency estimate 108 while preserving privacy.

The access frequency estimation system 100 can use the access frequency estimate 108 in a variety of possible ways, a few examples of which are described next.

In some implementations, the system 100 can generate a notification indicating an access frequency estimate, and provide the notification, e.g., for display by way of a user interface.

In some implementations, the system 100 can use an access frequency estimate to determine whether a cyberattack, e.g., a distributed denial-of-service (DDOS) attack, has occurred. For instance, the system can determine that a cyberattack has occurred if at least a threshold number of users have accessed the digital resource at least a threshold number of times within a time window.

In some implementations, the system 100 can modify conditions under which the digital resource is available to users based on an access frequency estimate. For instance, if users access the digital resource by receiving transmissions of a digital component, the system can modify distribution parameters controlling when the digital resource is transmitted to users based on an access frequency estimate, e.g., to cause the digital component to be transmitted to more or fewer users.

In some implementations, the system 100 can modify a digital resource based on an access frequency estimate. For instance, if the digital resource is a computational resource, then the system can increase or decrease the computing power available by way of the computational resource in response to determining that an access frequency estimate satisfies a threshold.

Example tree models 104 are described in more detail below with reference to FIG. 2 and FIG. 3.

FIG. 2 illustrates an example one-dimensional (1D) tree model 200 generated by an access frequency estimation system, e.g., the system 100 in FIG. 1. The tree model 200 illustrated in FIG. 2 is an example of a one-dimensional tree model. The access frequency estimation system can process the 1D tree model 200 to generate a fixed-window access frequency estimate.

As described above, the access frequency estimation system can generate the tree model 200 by processing access data for a digital resource. The access data can include, for each time point in a sequence of time points, data identifying a set of users that accessed the digital resource at the time point. FIG. 2 provides a simplified example of the tree model 200 that is generated based on access data that includes a sequence of eight time points. Generally, the access frequency estimation system can generate the tree model 200 by processing access data that includes any appropriate number of time points in the sequence of time points.

The tree model 200 includes a set of nodes, e.g., multiple leaf nodes 210 and multiple internal nodes 220, and a set of edges, where each edge connects a pair of nodes. Each node in the tree model 200 is associated with a key that specifies multiple time intervals in a time span. In FIG. 2, an example key for each node is illustrated as a pair of numbers in square brackets. For example, the node 212a includes the [1, 4] key. Similarly, the root node 212b includes the [1,8] key.

For each node in the one-dimensional tree model 200, the key for the node can be parametrized by a set of parameters that define a region of a one-dimensional space 230. For example, the key for each leaf node 210 in the one-dimensional tree model 200 can be parametrized by parameter t, and the parameters for the leaf nodes 210 can define a region of one-dimensional space given by t. For each parent node in the tree model 200, the region of the one-dimensional space defined by the key of the parent node can be partitioned by regions of the one-dimensional space defined by keys of child nodes of the parent node. For example, as illustrated in FIG. 2, the region of the one-dimensional space defined by the key [1, 4] of the parent node 212a is partitioned by the region of space defined by the key [1, 2] of the child node 212e and the region of space defined by the key [3, 4] of the child node 212d.

For one or more nodes in tree model 200, the key for the node can specify at least a first time interval, a second time interval, a third time interval, and a fourth time interval. In some cases, the first time interval, the second time interval, the third time interval, and the fourth time interval can be each different. As a particular example, for leaf nodes, the first time interval specified by each key can include t−1. The second time interval specified by each key can include [t,t+W−1], where W is a predefined hyper-parameter of the access frequency estimation system. The third time interval specified by each key can include t+W−1. The fourth time interval specified by each key can include [t−1, t+W−2]. In this implementation (e.g., the fixed-window reach implementation) of the access frequency estimation system, a user of the system can be restricted to querying access frequency estimates for time intervals of length W. Throughout this specification, in some cases, a single number can define a time interval, e.g., t−1 can define [t−1, t−1] time interval.

As described above, each node in the tree model 200 can be associated with a value that is based on a respective number of users that satisfy a node-specific selection criterion based on the time intervals specified by the key for the node. For each leaf node in the one-dimensional tree model 200 illustrated in FIG. 2, the value associated with the node can be based on a difference between: (i) a number of users that satisfy a first node-specific selection criterion based on the time intervals specified by the key for the node, and (ii) a number of users that satisfy a second node-specific selection criterion based on the time intervals specified by the key for the node.

For one or more leaf nodes 210 in the tree model 200, a user can satisfy the first node-specific selection criterion for the node only if the user: (i) accesses the digital resource in the first time interval, and (ii) accesses the digital resource a target number of times in the second time interval. A user can satisfy the second node-specific selection criterion for the node only if: (i) the user accesses the digital resource in the third time interval, and (ii) the user accesses the digital resource the target number of times in the fourth time interval. In some cases, the target number of times can be, e.g., zero. Each time the system generates the value based on the number of users for a leaf node in the tree model, e.g., as described above, the system can add this value to the parent node of the leaf node, and to any other ancestor nodes of the leaf node in the tree model. In this manner, the system can use the values determined for the leaf nodes in the tree model to determine the values for each other (e.g., non-leaf) node in the tree model.

An example two dimensional tree model is described in more detail below with reference to FIG. 3.

FIG. 3 illustrates an example two-dimensional (2D) tree model 300 generated by an access frequency estimation system, e.g., the access frequency estimation system 100 in FIG. 1. The access frequency estimation system can process the 2D tree model 300 to generate a time-window access frequency estimate.

As described above, the access frequency estimation system can generate the tree model 300 by processing access data for a digital resource. The access data can include, for each time point in a sequence of time points, data identifying a set of users that accessed the digital resource at the time point. Similarly to FIG. 2 above, FIG. 3 provides a simplified example of the tree model 300 that is generated based on access data that includes a sequence of eight time points. Generally, the access frequency estimation system can generate the tree model 300 by processing access data that includes any appropriate number of time points in the sequence of time points. In FIG. 3, some nodes of the tree model 300 are omitted for clarity.

For each node in the two-dimensional tree model 300, the key for the node is parameterized by a set of parameters that define a region of two-dimensional space 310. For example, the key for the node can be parameterized by respective parameters a, b, c, d. The parameters can define the region of the two-dimensional space given by: [a, b]×[c, d]. For each parent node in the tree model 300, the region of the two-dimensional space defined by the key of the parent node is partitioned by regions of the two-dimensional space defined by keys of child nodes of the parent node. For example, as illustrated in FIG. 3, for the parent node 302, the region of space 310 defined by the key of the parent node 302 is partitioned by the region of space 310-A of the child node 304-A, the region of space 310-B of the child node 304-B, the region of space 310-C of the child node 304-C, and the region of space 310-D of the child node 304-D. Similarly, for the parent node 304-D, the region of space 320 defined by the key of the parent node 304-D is partitioned by the region of space 320-A of the child node 306-A, the region of space 320-B of the child node 306-B, the region of space 320-C of the child node 306-C, and the region of space 320-D of the child node 306-D. For one or more nodes in the two-dimensional tree model 300, the key for the node specifies at least a first time interval, a second time interval, and a third time interval. In some cases, the first time interval, the second time interval, and the third time interval are each different. As a particular example, the first time interval specified by each key can include [a−1,b−1]. The second time interval specified by each key can include [T+2−d,T+2−c], where T is a last time point in the sequence of time points. The third time interval specified by each key can include [b,T+1−d].

As described above, each node in the two-dimensional tree model 300 can be associated with a value that is based on a respective number of users that satisfy a node-specific selection criterion based on the time intervals specified by the key for the node. For each of one or more nodes in the two-dimensional tree model 300 illustrated in FIG. 3, a user can satisfy the node-specific selection criterion for the node only if: (i) the user accesses the digital resource at least once in the first time interval and at least once in the second time interval, and (ii) the user accesses the digital resource a target number of times in the third time interval. In some cases, for one or more nodes in the two-dimensional tree model 300, the target number of times can be, e.g., zero.

An example process for digital resource access frequency estimation performed by the access frequency estimation system is described in more detail below with reference to FIG. 4.

Figure 4:
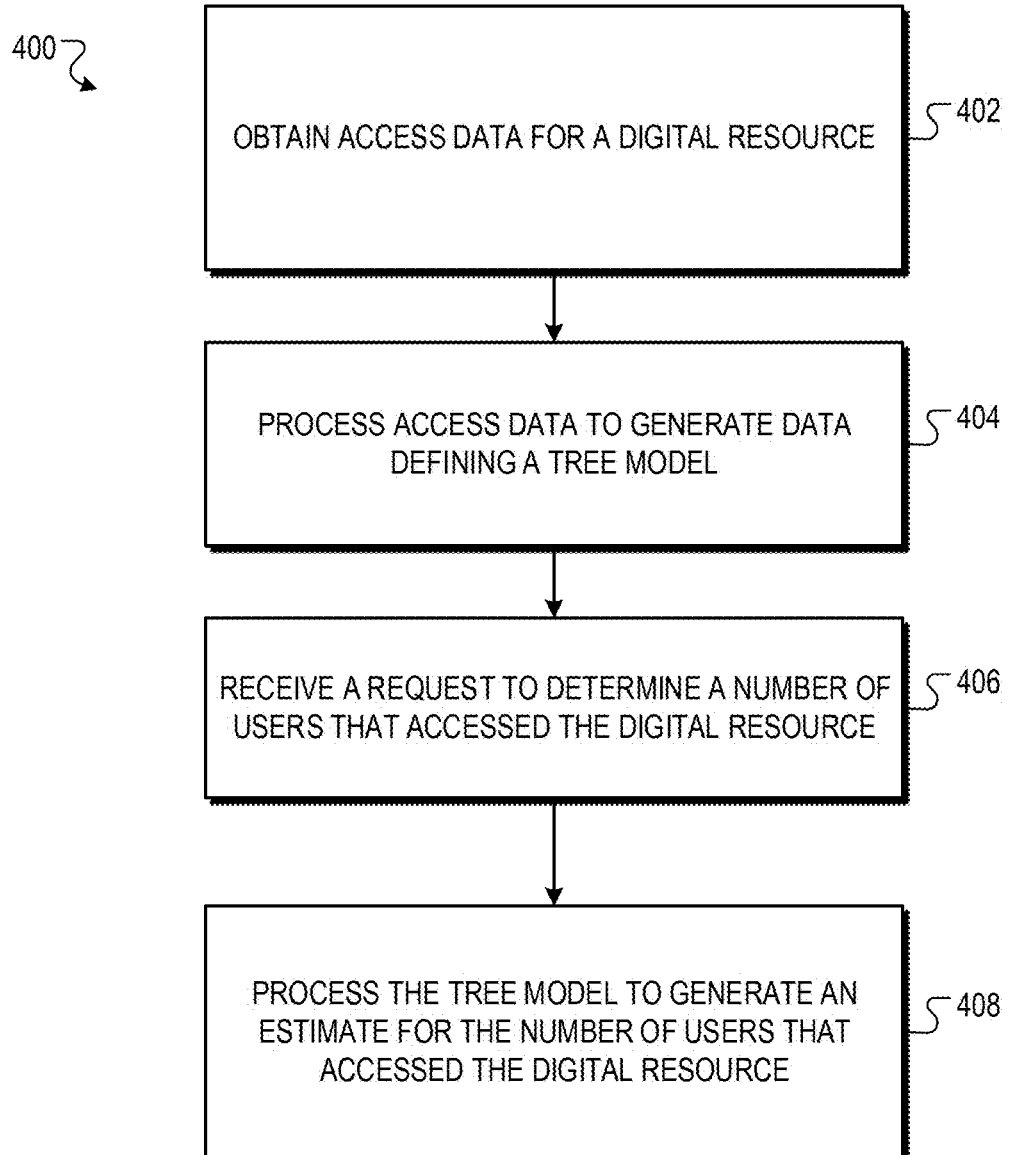
FIG. 4 is a flow diagram of an example process for access frequency estimation.

FIG. 4 is a flow diagram of an example process for digital resource access frequency estimation. For convenience, the process 400 is described as being performed by a system of one or more computers located in one or more locations. For example, an access frequency estimation system, e.g., the access frequency estimation system 100 of FIG. 1, appropriately programmed in accordance with this specification, can perform the process 400.

The system obtains access data for a digital resource (402). The access data can include, for each time point in a sequence of time points, data identifying a set of users that accessed the digital resource at the time point. In some cases, a user can access the digital resource by receiving a transmission of a digital component.

The system processes the access data to generate data defining a tree model (404). The tree model can be a binary tree model. The tree model can include a set of nodes, and each node in the set of nodes can be associated with: (i) a key that specifies multiple time intervals in the time span, and (ii) a value that is based on a respective number of users that satisfy a node-specific selection criterion based on the time intervals specified by the key for the node. In some cases, the tree model can further include a set of edges, where each edge connects a respective pair of nodes in the tree model. In some cases, the system can generate the tree model by adding respective noise to the value associated with each node in the tree model.

In some cases, for one or more nodes in the tree model, the key for the node can specify at least a first time interval, a second time interval, and a third time interval that are each different. In some cases, for one or more nodes in the tree model, a user can satisfy the node-specific selection criterion for the node only if: (i) the user accesses the digital resource at least once in the first time interval and at least once in the second time interval, and (ii) the user accesses the digital resource a target number of times in the third time interval. In some cases, for one or more nodes in the tree model, the target number of times can be zero.

In some implementations, the tree model can be a two-dimensional tree model. For each node in the tree model, the key for the node can be parameterized by a set of parameters that define a region of two-dimensional space. For example, for each parent node in the tree model: the region of the two-dimensional space defined by the key of the parent node is partitioned by regions of the two-dimensional space defined by keys of child nodes of the parent node. As a particular example, the key for the node can be parameterized by respective parameters a, b, c, d. The parameters define the region of two-dimensional space given by: [a, b]×[c, d]. The first time interval can include [a−1, b−1]. The second time interval can include [T+2−d,T+2−c], where T is a last time point in the sequence of time points. The third time interval can include [b,T+1−d].

In some implementations, for each node in the tree model, the value associated with the node can be based on a difference between: (i) a number of users that satisfy a first node-specific selection criterion based on the time intervals specified by the key for the node, and (ii) a number of users that satisfy a second node-specific selection criterion based on the time intervals specified by the key for the node. In such cases, for one or more nodes in the tree model, the key for the node can specify at least a first time interval, a second time interval, a third time interval, and a fourth time interval that are each different. For one or more leaf nodes in the tree model: a user can satisfy the first node-specific selection criterion for the node only if the user: (i) accesses the digital resource in the first time interval, and (ii) accesses the digital resource a target number of times in the second time interval, and a user can satisfy the second node-specific selection criterion for the node only if: (i) the user accesses the digital resource in the third time interval, and (ii) accesses the digital resource the target number of times in the fourth time interval. In some cases, the target number of times can be zero.

In some cases, the tree model can be a one-dimensional tree model. In such cases, for each node in the tree model, the key for the node can be parametrized by a set of parameters that define a region of a one-dimensional space. For example, for each parent node in the tree model: the region of the one-dimensional space defined by the key of the parent node is partitioned by regions of the one-dimensional space defined by keys of child nodes of the parent node. As a particular example, for one or more leaf nodes of the tree model: the key for the node can be parameterized by parameter t. The parameters can define the region of one-dimensional space given by t. The first time interval can include t−1. The second time interval can include [t,t+W−1], where W is a predefined hyper-parameter. The third time interval can include t+W−1. The fourth time interval can include [t−1, t+W−2].

The system receives a request to determine a number of users that accessed the digital resource at least a predefined number of times within a time window (406).

In response to the request, the system processes the tree model to generate an estimate for the number of users that accessed the digital resource at least the predefined number of times within the time window (408). The system can process the tree model by identifying multiple nodes in the tree model that each have a respective key which satisfies an identification criterion based on the time window. For example, the system can identify that one or more leaf nodes of the tree model and one or more internal nodes of the tree model each have a respective key which satisfies the identification criterion based on the time window.

As a particular example, the system can process the one-dimensional (1D) tree model to identify nodes having keys which satisfy the identification criterion according to "Differential Privacy Fixed Window Reach Query" algorithm outlined in more detail below, where $S_i$ is a set of users that accessed the digital resource at time step i, $S_{i+W−1}$ is a set of users that accessed the digital resource at time step i+W−1, W is a time window length, $n_{[a,b]}$ is the value of the node associated with interval [a, b], and lsbit(i) denotes the index of the least significant bit of i. In particular, the input to the process is a time index i, and the output is an estimate of the number of users that accessed the digital resources at least once in the time interval [i,i+W−1]. It will be appreciated that the Differential Privacy Fixed Window Reach Query requires combining at most log T nodes in the tree model, where T is the overall time range covered by the access data.

| Differential Privacy Fixed-Window Reach Query |
|---|
| 1:      Input: i |
| 2:      Output: estimate of $|S_i \cup \cdots \cup S_{i+W−1}|$ |
| 3:      ans ← d |
| 4:      while i > 0 do |
| 5:         ans ← ans − $n_{[i−2^{lsbit(i)}+1,i]}$ |
|      {remove counts from each maximal node no larger than i} |
| 6:         i ← i − $2^{lsbit(i)}$ |
| 7:      return: ans |

As another particular example, the system can process the two-dimensional (2D) tree model to identify nodes having keys which satisfy the identification criterion according to "Differential Privacy Time Window Reach Query" algorithm outlined in more detail below, where $S_i$ is a set of users that accessed the digital resource at time step i, $S_j$ is a set of users that accessed the digital resource at time step j, T is a total number of time steps, d is the total number of users, n is a number of users, lsbit(i) denotes the index of the least significant bit of i, and lsbit(j) denotes the index of the least significant bit of j. In particular, the input to the process is a time range [i, j], and the output of the process is an estimate for the number of users that accessed the digital resource at least once in the time interval [i, j]. It will be appreciated that the Differential Privacy Time Window Reach Query algorithm requires combining at most $log^2$ T nodes, where T is the overall time range covered by the access data.

| Differential Privacy Time-Window Reach Query |
|---|
| 1:      Input: i, j |
| 2:      Output: estimate of $|S_i \cup \cdots \cup S_j|$ |
| 3:      ans ← d |
| 4:      while i > 0 do |
| 5:         j̄ ← T + 1 − j |
| 6:         while j̄ > 0 do |
| 7:            ans ← ans − $n_{[i−2^{lsbit(i)}+1,i] \times [j−2^{lsbit(j̄)}+1,j]}$ |
|      {subtract counts from each maximal node no larger than (i, j̄ )} |
| 8:         j̄ ← j̄ − $2^{lsbit(j̄)}$ |
| 9:         i ← i − $2^{lsbit(i)}$ |
| 10:     return: ans |

The system can determine a combination of the values associated with the identified nodes, e.g., as a sum of the values associated with the identified nodes. Then, the system can generate the estimate for the number of users based at least in part on the combination of the values associated with the identified nodes. In some cases, the system can output the estimate for the number of users that accessed the digital resource at least the predefined number of times within the time window.

An example environment in which digital components are distributed is described in more detail next.

Figure 5:
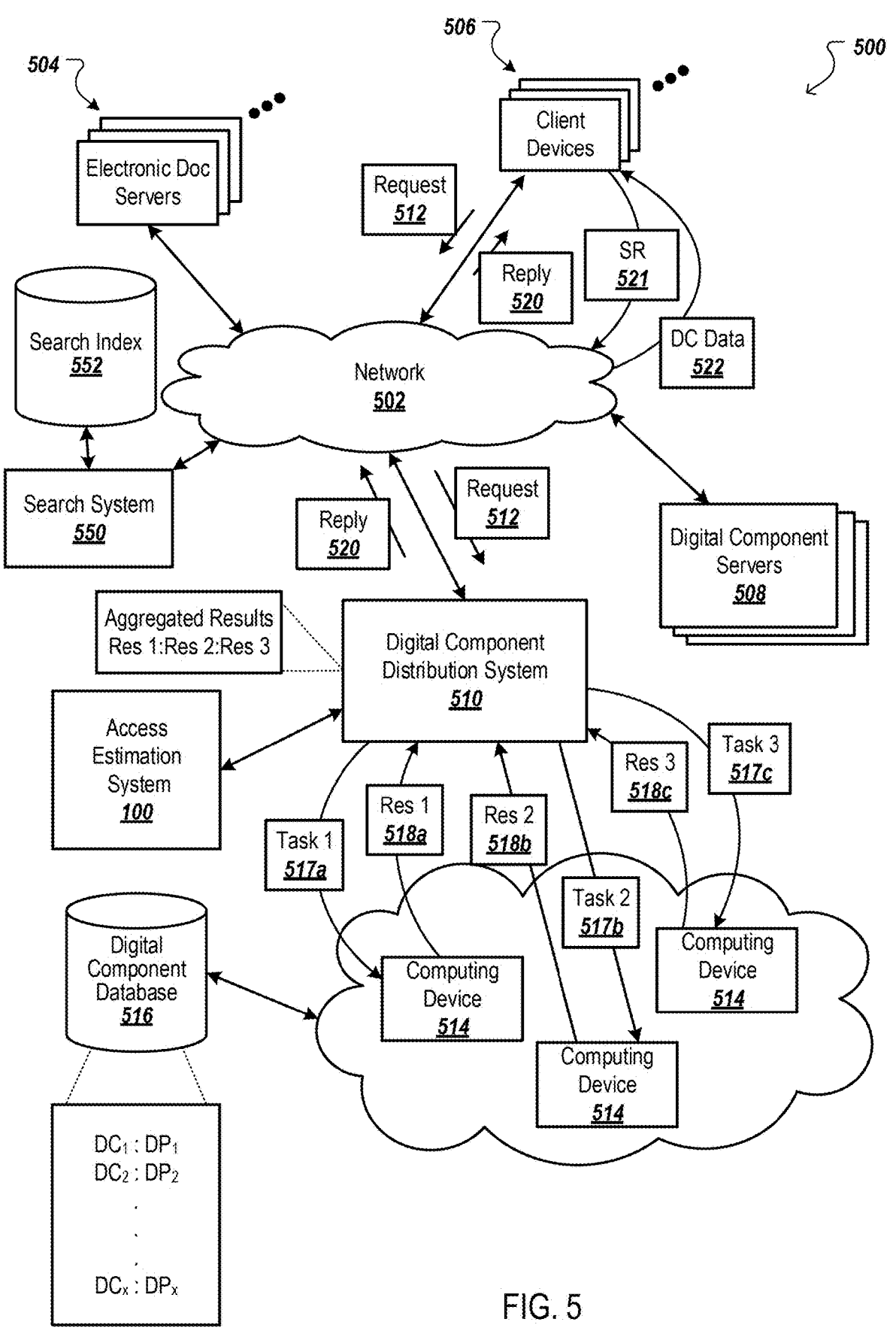
FIG. 5 is a block diagram of an example environment in which digital components are distributed.

FIG. 5 is a block diagram of an example environment 500 in which digital components are transmitted for presentation with electronic documents. This specification describes techniques that can be used for privacy sensitive estimation of a number of users that received at least a threshold number of transmissions of a digital component within a time window.

The environment 500 can include an access frequency estimation system 100 (e.g., the access frequency estimation system 100 described above with reference to FIG. 1). The access frequency estimation system 100 can obtain access data for a digital resource, where the access data includes, for each time point in a sequence of time points, data identifying a set of users that accessed the digital resource (e.g., the digital component) at the time point. The system 100 can process the access data to perform access frequency estimation, e.g., generate an estimate for the number of users that accessed the digital resource (e.g., the digital component) at least the predefined number of times within a time window. The system 100 can use the estimate in a variety of different ways. For example, if users access the digital resource by receiving transmissions of a digital component, the system 100 can modify distribution parameters controlling when the digital resource is transmitted to users based on an access frequency estimate, e.g., to cause the digital component to be transmitted to more or fewer users.

The example environment 500 includes a network 502, such as a local area network (LAN), a wide area network (WAN), the Internet, or a combination thereof. The network 502 connects electronic document servers 504, client devices 506, digital component servers 508, and a digital component distribution system 510 (also referred to as a "distribution system" 510). The example environment 500 may include many different electronic document servers 504, client devices 506, and digital component servers 508.

A client device 506 is an electronic device that is capable of requesting and receiving resources over the network 502. Example client devices 506 include personal computers, mobile communication devices (e.g., mobile phones), and other devices that can send and receive data over the network 502. A client device 506 typically includes a user application, such as a web browser, to facilitate the sending and receiving of data over the network 502, but native applications executed by the client device 506 can also facilitate the sending and receiving of data over the network 502.

An electronic document is data that presents a set of content at a client device 506. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 506 by electronic document servers 504 ("Electronic Doc Servers"). For example, the electronic document servers 504 can include servers that host publisher websites. In this example, the client device 506 can initiate a request for a given publisher webpage, and the electronic server 504 that hosts the given publisher webpage can respond to the request by sending machine executable instructions that initiate presentation of the given webpage at the client device 506.

In another example, the electronic document servers 504 can include app servers from which client devices 506 can download apps. In this example, the client device 506 can download files required to install an app at the client device 506, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 506 to request content from the data source when the given electronic document is processed (e.g., rendered or executed) by a client device 506. The client device 506 integrates the content obtained from the data source into the given electronic document to create a composite electronic document including the content obtained from the data source.

In some situations, a given electronic document can include one or more digital component tags or digital component scripts that reference the digital component distribution system 510. In these situations, the digital component tags or digital component scripts are executed by the client device 506 when the given electronic document is processed by the client device 506. Execution of the digital component tags or digital component scripts configures the client device 506 to generate a request for one or more digital components 512 (referred to as a "component request"), which is transmitted over the network 502 to the digital component distribution system 510. For example, a digital component tag or digital component script can enable the client device 506 to generate a packetized data request including a header and payload data. The component request 512 can include event data specifying features such as a name (or network location) of a server from which the digital component is being requested, a name (or network location) of the requesting device (e.g., the client device 506), and/or information that the digital component distribution system 510 can use to select one or more digital components provided in response to the request. The component request 512 is transmitted, by the client device 506, over the network 502 (e.g., a telecommunications network) to a server of the digital component distribution system 510.

The component request 512 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 510. Similarly, event data specifying keywords associated with the electronic document ("document keywords") or entities (e.g., people, places, or things) that are referenced by the electronic document can also be included in the component request 512 (e.g., as payload data) and provided to the digital component distribution system 510 to facilitate identification of digital components that are eligible for presentation with the electronic document. The event data can also include a search query that was submitted from the client device 506 to obtain a search results page, and/or data specifying search results and/or textual, audible, or other visual content that is included in the search results.

Component requests 512 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 512 can be transmitted, for example, over a packetized network, and the component requests 512 themselves can be formatted as packetized data having a header and payload data. The header can specify a destination of the packet and the payload data can include any of the information discussed above.

The component distribution system 510 chooses digital components that will be presented with the given electronic document in response to receiving the component request 512 and/or using information included in the component request 512. In some implementations, a digital component is selected (using the techniques described herein) in less than a second to avoid errors that could be caused by delayed selection of the digital component. For example, delays in providing digital components in response to a component request 512 can result in page load errors at the client device 506 or cause portions of the electronic document to remain unpopulated even after other portions of the electronic document are presented at the client device 506. Also, as the delay in providing the digital component to the client device 506 increases, it is more likely that the electronic document will no longer be presented at the client device 506 when the digital component is delivered to the client device 506, thereby negatively impacting a user's experience with the electronic document. Further, delays in providing the digital component can result in a failed delivery of the digital component, for example, if the electronic document is no longer presented at the client device 506 when the digital component is provided.

In some implementations, the digital component distribution system 510 is implemented in a distributed computing system that includes, for example, a server and a set of multiple computing devices 514 that are interconnected and identify and distribute digital components in response to requests 512. The set of multiple computing devices 514 operate together to identify a set of digital components that are eligible to be presented in the electronic document from a corpus of millions of available digital components (DC1-$x$). The millions of available digital components can be indexed, for example, in a digital component database 516. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 512) in order for the digital component to be eligible for presentation. In other words, the distribution parameters are used to trigger distribution (e.g., transmission) of the digital components over the network 502. The distribution parameters can also require that the component request 512 include information specifying a particular geographic region (e.g., country or state) and/or information specifying that the component request 512 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks 517a-517c that are then assigned among computing devices within the set of multiple computing devices 514. For example, different computing devices in the set 514 can each analyze a different portion of the digital component database 516 to identify various digital components having distribution parameters that match information included in the component request 512. In some implementations, each given computing device in the set 514 can analyze a different data dimension (or set of dimensions) and pass (e.g., transmit) results (Res 1-Res 3) 518a-518c of the analysis back to the digital component distribution system 510. For example, the results 518a-518c provided by each of the computing devices in the set 514 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 510 aggregates the results 518a-518c received from the set of multiple computing devices 514 and uses information associated with the aggregated results to: (i) select one or more digital components that will be provided in response to the request 512, and (ii) determine transmission requirements for the one or more digital components. For example, the digital component distribution system 510 can select a set of winning digital components (one or more digital components) based on the outcome of one or more component evaluation processes. In turn, the digital component distribution system 510 can generate and transmit, over the network 502, reply data 520) (e.g., digital data representing a reply) that enables the client device 506 to integrate the set of winning digital components into the given electronic document, such that the set of winning digital components and the content of the electronic document are presented together at a display of the client device 506.

In some implementations, the client device 506 executes instructions included in the reply data 520, which configures and enables the client device 506 to obtain the set of winning digital components from one or more digital component servers. For example, the instructions in the reply data 520 can include a network location (e.g., a Uniform Resource Locator (URL)) and a script that causes the client device 506 to transmit a server request (SR) 521 to the digital component server 508 to obtain a given winning digital component from the digital component server 508. In response to the request, the digital component server 508 will identify the given winning digital component specified in the server request 521 (e.g., within a database storing multiple digital components) and transmit, to the client device 506, digital component data (DC Data) 522 that presents the given winning digital component in the electronic document at the client device 506.

To facilitate searching of electronic documents, the environment 500 can include a search system 550) that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 552 (e.g., hardware memory device(s)). Data that are associated with an electronic document is data that represents content included in the electronic document and/or metadata for the electronic document.

Client devices 506 can submit search queries to the search system 550 over the network 502. In response, the search system 550 accesses the search index 552 to identify electronic documents that are relevant to the search query. The search system 550 identifies the electronic documents in the form of search results and returns the search results to the client device 506 in a search results page. A search result is data generated by the search system 550) that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 506. In some situations, the search system 550) can be part of, or interact with, an application store (or an online portal) from which applications can be downloaded for install at a client device 506 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 510 may identify a set of digital components that are eligible to be transmitted in response to the component request. The distribution system 510 may then select one or more of the eligible digital components to be transmitted through, e.g., an auction procedure. In some implementations, the distribution system 510 performs an auction procedure by ranking the eligible digital components in accordance with their respective eligibility values, and selecting one or more highest-ranked digital components to be transmitted in response to the component request.

For example, the distribution system 510 may identify digital components A, B, and C as eligible to be transmitted in response to a component request. In this example, digital component A has an eligibility value of 5, digital component B has an eligibility value of 1, and digital component C has an eligibility value of 5.5, where the eligibility values of the digital components represent bids associated with the digital components. The distribution system 510 may rank (e.g., in descending order) the digital components in accordance with their respective eligibility values as: C, A, B. Finally, the distribution system 510 may select the highest ranked digital component C for transmission in response to the component request After selecting a digital component to be transmitted in response to a digital component request, the distribution system 510 determines a transmission requirement for the selected digital component. A transmission requirement specifies an action to be performed by the provider of a digital component in response to a transmission of the digital component. For example, the transmission requirement may specify that the provider of the digital component submit an amount of compensation in response to the transmission of the digital component. In some cases, the amount of compensation specifies an amount to be submitted for each instance of specific events attributed to the presentation of the digital component (e.g., user interactions with the digital component).

The distribution system 510 may determine the transmission requirement of the selected digital component based on the eligibility value of the selected digital component and/or the eligibility values of the other digital components that were determined as eligible to be transmitted in response to the component request. For example, the distribution system 510 may identify digital components A, B, and C as eligible for transmission in response to a digital component request, where A. B, and C have respective eligibility values of 5, 1, and 5.5. The distribution system 510 may select digital component C for transmission (since it has the highest eligibility value), and may determine the transmission requirement for digital component C to be the next highest eligibility value from amongst the eligibility values of the eligible digital components. In this example, next highest eligibility value is $5 (i.e., the eligibility value of digital component A), and therefore the distribution system 510 may determine the transmission requirement of digital component C to be $5.

As described above, the distribution system 510 may identify a set of digital components that are eligible to be transmitted for presentation in an electronic document in response to a digital component request based on distribution parameters corresponding to each digital component. In some cases, the distribution parameters corresponding to a digital component may include a keyword cluster (i.e., a set of multiple keywords). The distribution system 510 may determine that one or more keywords from the keyword cluster must be matched (e.g., by electronic documents, document keywords, or terms specified in a digital component request) in order for the digital component to be eligible for transmission.

For example, the distribution system 510 may receive a digital component request which includes a specific keyword. In this example, the distribution system 510 may determine that a particular digital component with distribution parameters specifying a keyword cluster is eligible for transmission in response to the digital component request only if the specific keyword is included in the keyword cluster.

In some implementations, the distribution system 510 enables providers of digital components to set distribution parameters specifying keyword clusters from a predetermined set of keyword clusters. The keyword clusters output by the clustering system 100 may define a grouping of keywords into semantically related keyword clusters. For example, a keyword cluster can define an assignment of the keywords "shoes", "shoe", "footwear", "boots", "cleats", "heels", "slippers", "sneakers", and the like, to the same cluster.

Figure 6:
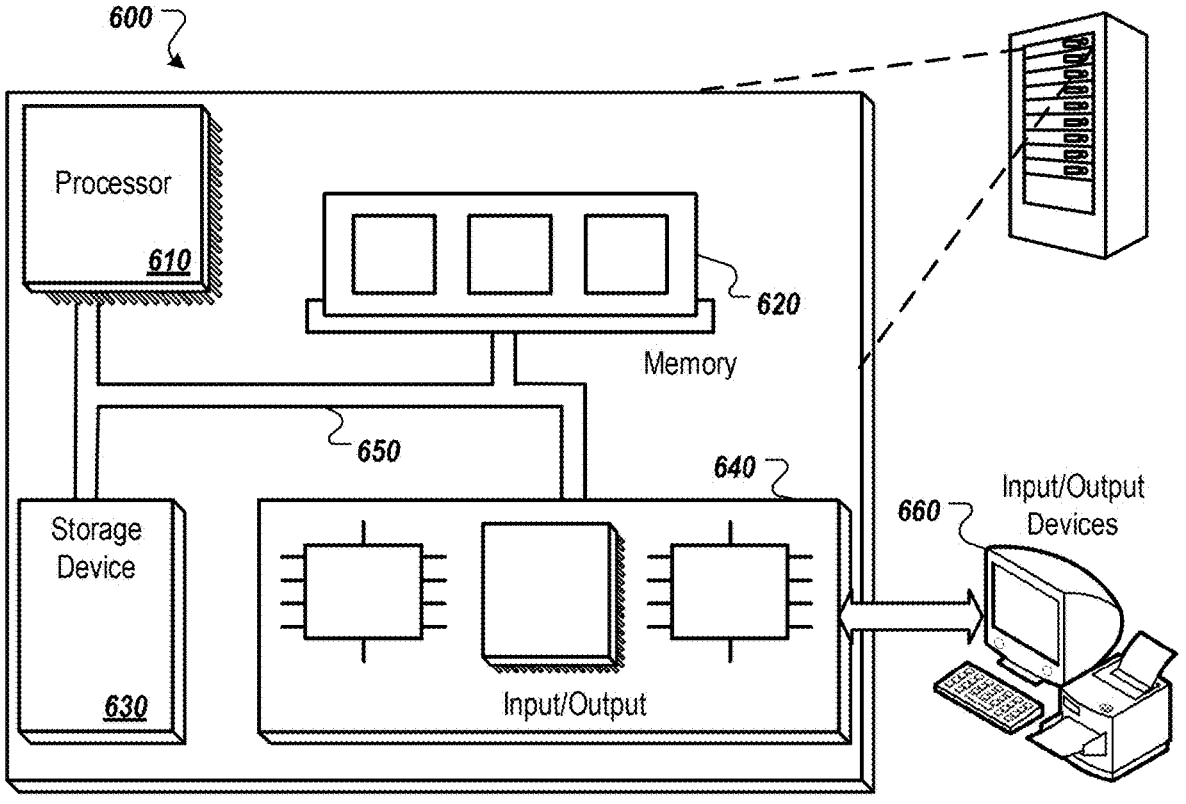
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640) can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640) can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few:

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for performing privacy preserving estimation of user access of digital resources, the method comprising:

obtaining access data for a digital resource, wherein the access data comprises, for each time point in a sequence of time points over a time span, data identifying a set of users that accessed the digital resource at the time point;

processing the access data to generate data defining a tree model, wherein the tree model comprises a set of nodes, and each node in the set of nodes is associated with:

(i) a respective key for the node that specifies a plurality of time intervals in the time span that are represented by the node, and (ii) a respective value for the node that is based on a combination of a respective noise for the node with a respective number of users that satisfy a node-specific selection criterion based on the plurality of time intervals in the time span that are represented by the node;

receiving a request to determine a number of users that accessed the digital resource at least a predefined number of times within a time window; and in response to the request:

processing the tree model to generate an estimate for the number of users that accessed the digital resource at least the predefined number of times within the time window, wherein generating the estimate for the number of users that accessed the digital resource at least the predefined number of times within the time window comprises:

identifying one or more nodes of the tree model based on the time window; and generating the estimate for the number of users that accessed the digital resource at least the predefined number of times within the time window based on the respective values for the one or more identified nodes; and outputting the estimate for the number of users that accessed the digital resource at least the predefined number of times within the time window.

2. The method of claim 1, wherein for one or more nodes in tree model, the respective key for the node specifies at least a first time interval, a second time interval, and a third time interval for the node;

wherein the first time interval, the second time interval, and the third time interval are each different.

3. The method of claim 2, wherein for the one or more nodes in the tree model, a user satisfies the node-specific selection criterion for the node only if:

(i) the user accesses the digital resource at least once in the first time interval for the node and at least once in the second time interval for the node; and (ii) the user accesses the digital resource a target number of times in the third time interval for the node.

4. The method of claim 3, wherein for one or more nodes in the tree model, the target number of times is zero.

5. The method of claim 2, wherein:

(i) the tree model is a two-dimensional tree model, (ii) for each node in the tree model, the respective key for the node is parameterized by a set of parameters that define a region of two-dimensional space, and (iii) for each parent node in the tree model, the region of the two-dimensional space defined by the key of the parent node is partitioned by regions of the two-dimensional space defined by the respective keys of child nodes of the parent node.

6. The method of claim 5, wherein for each node in the tree model:

the respective key for the node is parameterized by respective parameters a, b, c, d;

the parameters define the region of two-dimensional space given by: $[a, b] \times [c, d]$;

the first time interval for the node comprises $[a-1, b-1]$;

the second time interval for the node comprises $[T+2-d, T+2-c]$, wherein T is a last time point in the sequence of time points; and the third time interval for the node comprises $[b, T+1-d]$.

7. The method of claim 1, wherein for each node in the tree model, the respective value for the node is based on a difference between: (i) a number of users that satisfy a first node-specific selection criterion based on the plurality of time intervals specified by the respective key for the node, and (ii) a number of users that satisfy a second node-specific selection criterion based on the plurality of time intervals specified by the respective key for the node.

8. The method of claim 7, wherein for one or more nodes in the tree model, the respective key for the node specifies at least a first time interval, a second time interval, a third time interval, and a fourth time interval for the node; wherein the first time interval, the second time interval, the third time interval, and the fourth time interval are each different.

9. The method of claim 8, wherein for one or more leaf nodes in the tree model:

a user satisfies the first node-specific selection criterion for the node only if the user: (i) accesses the digital resource in the first time interval for the leaf node, and (ii) accesses the digital resource a target number of times in the second time interval for the leaf node; and a user satisfies the second node-specific selection criterion for the node only if: (i) the user accesses the digital resource in the third time interval for the leaf node, and (ii) accesses the digital resource the target number of times in the fourth time interval for the leaf node.

10. The method of claim 9, wherein the target number of times is zero.

11. The method of claim 8, wherein:

(i) the tree model is a one-dimensional tree model, (ii) for each node in the tree model, the respective key for the node is parametrized by a set of parameters that define a region of a one-dimensional space, and (iii) for each parent node in the tree model, the region of the one-dimensional space defined by the key of the parent node is partitioned by regions of the one-dimensional space defined by the respective keys of child nodes of the parent node.

12. The method of claim 11, wherein for one or more leaf nodes of the tree model:

the respective key for the leaf node is parameterized by parameter t;

the parameters define the region of one-dimensional space given by t;

the first time interval for the leaf node comprises $t-1$;

the second time interval for the leaf node comprises $[t, t+W-1]$, wherein W is a predefined hyper-parameter;

the third time interval for the leaf node comprises $t+W-1$; and the fourth time interval for the leaf node comprises $[t-1, t+W-2]$.

13. The method of claim 1, wherein generating the tree model comprises:

for each node in the tree model, adding the respective noise for the node to the value for the node.

14. The method of claim 1, wherein processing the tree model to generate the estimate for the number of users that accessed the digital resource at least the predefined number of times within the time window comprises:

identifying a plurality of nodes in the tree model that each have a respective key which satisfies an identification criterion based on the time window;

determining a combination of the respective values for the identified nodes; and generating the estimate for the number of users based at least in part on the combination of the respective values for the identified nodes.

15. The method of claim 14, wherein identifying the plurality of nodes in the tree model comprises:

identifying that one or more leaf nodes of the tree model and one or more internal nodes of the tree model each have a respective key which satisfies the identification criterion based on the time window, and wherein determining the combination of the respective values for the identified nodes comprises:

determining a sum of the respective values for the identified nodes.

16. The method of claim 1, wherein a user accesses the digital resource by receiving a transmission of a digital component.

17. The method of claim 1, wherein the tree model comprises a set of edges, wherein each edge connects a respective pair of nodes in the tree model, and wherein the tree model is a binary tree model.

18. A system comprising:

one or more computers; and one or more storage devices communicatively coupled to the one or more computers, wherein the one or more storage devices store instructions that, when executed by the one or more computers, cause the one or more computers to perform operations comprising:

obtaining access data for a digital resource, wherein the access data comprises, for each time point in a sequence of time points over a time span, data identifying a set of users that accessed the digital resource at the time point;

processing the access data to generate data defining a tree model, wherein the tree model comprises a set of nodes, and each node in the set of nodes is associated with:

(i) a respective key for the node that specifies a plurality of time intervals in the time span that are represented by the node, and (ii) a respective value for the node that is based on a combination of a respective noise for the node with a respective number of users that satisfy a node-specific selection criterion based on the plurality of time intervals in the time span that are represented by the node;

receiving a request to determine a number of users that accessed the digital resource at least a predefined number of times within a time window; and in response to the request:

processing the tree model to generate an estimate for the number of users that accessed the digital resource at least the predefined number of times within the time window, wherein generating the estimate for the number of users that accessed the digital resource at least the predefined number of times within the time window comprises:

identifying one or more nodes of the tree model based on the time window; and generating the estimate for the number of users that accessed the digital resource at least the pre-defined number of times within the time window based on the respective values for the one or more identified nodes; and outputting the estimate for the number of users that accessed the digital resource at least the predefined number of times within the time window.

19. One or more non-transitory computer storage media storing instructions that when executed by one or more computers cause the one or more computers to perform operations comprising:

obtaining access data for a digital resource, wherein the access data comprises, for each time point in a sequence of time points over a time span, data identifying a set of users that accessed the digital resource at the time point;

processing the access data to generate data defining a tree model, wherein the tree model comprises a set of nodes, and each node in the set of nodes is associated with:

(i) a respective key for the node that specifies a plurality of time intervals in the time span that are represented by the node, and (ii) a respective value for the node that is based on a combination of a respective noise for the node with a respective number of users that satisfy a node-specific selection criterion based on the plurality of time intervals in the time span that are represented by the node;

receiving a request to determine a number of users that accessed the digital resource at least a predefined number of times within a time window; and in response to the request:

processing the tree model to generate an estimate for the number of users that accessed the digital resource at least the predefined number of times within the time window, wherein generating the estimate for the number of users that accessed the digital resource at least the predefined number of times within the time window comprises:

identifying one or more nodes of the tree model based on the time window; and generating the estimate for the number of users that accessed the digital resource at least the pre-defined number of times within the time window based on the respective values for the one or more identified nodes; and outputting the estimate for the number of users that accessed the digital resource at least the predefined number of times within the time window.

20. The one or more non-transitory computer storage media of claim 19, wherein for one or more nodes in tree model, the respective key for the node specifies at least a first time interval, a second time interval, and a third time interval for the node;

wherein the first time interval, the second time interval, and the third time interval are each different.

* * * * *